US005973855A

United States Patent [19]

Shibayama

[11] Patent Number: 5,973,855

[45] Date of Patent: Oct. 26, 1999

[54] ZOOM LENS ADJUSTMENT METHOD

[75] Inventor: Atsushi Shibayama, Tokyo, Japan

[73] Assignee: Nikon Corporation, Tokyo, Japan

[21] Appl. No.: 09/198,936

[22] Filed: Nov. 24, 1998

[30] Foreign Application Priority Data

Dec. 5, 1997 [JP] Japan .................................... 9-352239

[51] Int. Cl.[6] .............................. G02B 15/14; G02B 7/10; G03B 17/00

[52] U.S. Cl. .......................... 359/691; 359/694; 359/700; 396/81; 396/91; 396/104; 396/379; 396/554

[58] Field of Search .................................... 359/694, 700, 359/691, 677; 396/80, 81, 91, 103, 104, 379, 554

[56] References Cited

U.S. PATENT DOCUMENTS

| | | | |
|---|---|---|---|
| 4,281,907 | 8/1981 | Kamata | 359/700 |
| 4,618,253 | 10/1986 | Arai | 355/57 |
| 5,089,841 | 2/1992 | Yamada | 396/77 |
| 5,422,699 | 6/1995 | Sato et al. | 396/91 |
| 5,680,255 | 10/1997 | Imanari | 359/700 |
| 5,867,217 | 2/1999 | Okino et al. | 396/379 |

*Primary Examiner*—Georgia Epps
*Assistant Examiner*—Evelyn A. Lester
*Attorney, Agent, or Firm*—Downs Rachlin & Martin PLLC

[57] ABSTRACT

A zoom lens adjustment method capable of being applied to zoom lenses for use in video cameras, electronic still cameras, or the like employing solid-state image sensors. An amount of integral movement δ1 by which a first lens group (G1) and a second lens group (G2) must axially move from an extreme-wide-angle-state (W) reference positions to cause the actual and reference image planes (IPA and IPR) to coincide is determined. Then, an amount of additional movement δ2 by which only the first lens group must be moved to cause the actual and reference image planes to coincide after causing the first and second lens groups to move in integral fashion by the amount δ1 when in the extreme-telephoto-state reference positions is determined. Then, from the values of δ1 and δ2, amounts of positional correction P1 and P2 of first and second lens groups, respectively, from respective reference positions in one of the focal length states between the extreme wide-angle and extreme telephoto states are established. These positional corrections are then applied to the lens groups to reduce or eliminate the positional misalignment between the actual and reference object planes.

7 Claims, 8 Drawing Sheets

ZOOM LENS ADJUSTMENT METHOD

FIELD OF THE INVENTION

The present invention pertains to a zoom lens adjustment method, and in particular to a method for adjusting positional misalignment between the actual image plane and the reference image plane.

BACKGROUND OF THE INVENTION

Zoom lenses, such as those used single-lens reflex cameras, employ mechanical cam systems to position variable-magnification lens groups, i.e., lens groups that move along the optical axis during changes in magnification ("zooming").

A prior art mechanical cam zoom mechanism ("cam") 5 for positioning lens groups in a zoom lens is shown in FIG. 1. Cam 5 includes a pin p1, which protrudes from a first lens group retaining member (not shown) and passes through a zoom cam track 8 and a linear cam track 12. The latter is formed so as to extend in a direction parallel to the optical axis A of the zoom lens. A pin p2 protrudes from a second lens group retaining member (not shown) and passes through a zoom cam track 14 and linear cam track 12. Zoom cam tracks 8 and 14 are formed to correspond to the zoom trajectories of first and second lens groups G1 and G2, respectively. Cam 5 is designed to allow linear cam track 12 to move parallel to itself, as indicated by double-arrow 18, between positions 22 and 24 when the zoom lens is in the extreme wide-angle state and the extreme telephoto state, respectively.

In the intermediate focal length state (i.e., when cam track 12 is between positions 22 and 24, as is shown in FIG. 1), the positions of pin p1 and p2 correspond to the position of the first lens group G1 and second lens group G2, respectively.

With reference now to FIG. 2, zoom lens 50 shows zoom trajectories 52 and 54 associated with first and second lens groups G1 and G2, respectively, for cam 5 of FIG. 1. The case shown in FIG. 2 is when there is no positional misalignment between the actual image plane $IPW_1$ in the extreme wide-angle state (W) and the actual image plane $IPT_1$ in extreme telephoto state (T) relative to reference image plane IPR. Reference image plane IPR is the image plane contemplated during design, and is where photosensitive film, a CDD array, or other image sensor resides. Image planes $IPW_1$, IPR and $IPT_1$ coincide when the focal lengths of lens groups G1 and G2, the distances between respective lens groups, and the profiles of the respective cam tracks all possess their design values.

In a zoom lens as actually manufactured, however, errors arise. For example, the focal lengths of the lens groups and the distances between respective lens groups differ from their design values due to errors in radii of curvature of lens surfaces, distances between lens surfaces, lens thicknesses, refractive indices of lens materials, and so forth. In addition, there are also machining errors in the profiles of the respective cam tracks. With reference now to FIG. 3, zoom lens 60 of FIG. 3 is the essentially the same as zoom lens 10 of FIG. 2, except that zoom lens 60 has the above-described manufacturing errors, and also suffers from being assembled without any adjustment. In this case, zoom trajectories 52' and 54' for zoom lens 60 will differ from their ideal trajectories 52 and 54 of zoom lens 50. Thus, for zoom lens 60, the actual image plane $IPW_2$ in the extreme wide-angle state (W), the actual image plane $IPT_2$ in the extreme telephoto state (T) and the reference image plane IR do not coincide.

In a conventional zoom lens, such as zoom lens 50 of FIG. 2, focusing is carried out by causing the first lens group G1 (i.e., the most objectwise lens group) to move along axis A (i.e., move axially). When employing this focusing method, a helicoid mechanism (not shown) is provided for the first lens group G1, which accommodates the respective states for filming objects at different distances i.e., from an infinite-distance focus state to a short-distance focus state. Such focusing is achieved by appropriately changing the angular displacement of the helicoid mechanism and controlling the amount of focusing movement of first lens group G1. The location of reference image plane IPR is defined based on the location of a mounting reference plane (not shown) for mounting film, CCDs, etc., provided on the lens barrel (not shown). The mechanism is designed such that the position of the mounting reference plane with respect to the principal structures (cams, etc.) of the zoom lens can be adjusted by means of washers (i.e., shims).

With reference now to FIG. 4, measuring apparatus 70 measures the position of image plane IP of a "target" zoom lens 74 to which adjustment is to be carried out using conventional zoom lens adjustment methods. Measuring apparatus 70 comprises, in order along an optical axis A1, a light source 80 for generating a diverging light beam 82, a slit 84, a half-mirror (i.e., beam splitter) 86, a collimating lens 88, and a mirror 90 with a reflective surface 92. Also included in apparatus 70 along an axis A2 which intersects axis A1 at half-mirror 86, is an ocular 94 and a reticle 96. The above-mentioned elements, except for mirror 90, constitute a collimator 100.

In measuring apparatus 70, light beam 82 from light source 80 passes through slit 84, is incident half mirror 86 and passes therethrough to collimating lens 88. The latter converts diverging light beam 82 into a collimated beam 104, which is equivalent to light from an object at an infinite distance. Collimated light beam 104 is then incident target lens 74, which transforms the collimated light beam into a converging light beam 106. The latter is incident reflective surface 92 of mirror 90 arranged in the vicinity of image plane IP of target lens 74.

Mirror 90 is made to move back and forth along optical axis A1 to measure the position of image plane IP. When reflecting surface 92 of mirror 90 coincides with the position of image plane IP, then converging light beam 106 is reflected from surface 92, thereby forming a diverging light beam 106' which travels back along the path of converging light beam 106. Diverging light beam 106' passes back through target lens 74, which forms a collimated light beam 104' which travels back along the path of collimated light beam 104. Collimated light beam 104' is then incident collimator lens 88, which forms a converging light beam 82', which travels back along the path of diverging light beam 82. Converging light beam 82' proceeds to half mirror 86, which reflects converging light beam 82' to form an image on reticle 96.

When the position of reflecting surface 92 of mirror 90 is shifted along optical axis A1 such that it no longer coincides with the position of image plane IP, then diverging light beam 106' is not reflected back precisely along the path of converging light beam 106. Consequently, light beam 104' traveling back toward light source 80 will not be collimated, i.e., will be a divergent light beam or a convergent light beam. Accordingly, the image formed on reticle 96 will be observed by an observer 110 to be out of focus.

With reference also to FIG. 3, using measuring apparatus 70 of FIG. 4 and the conventional image plane position measuring technique described above, the position of actual image plane $IPW_2$ when in the extreme wide-angle state and the position of the actual image plane $IPT_2$ when in the extreme telephoto state can be measured by the appropriate adjustment of the lens groups. As a result, it is possible to determine the amount of positional misalignment d between actual image planes $IPW_2$ and $IPT_2$.

With reference now to FIG. 5, a lens L lying along optical axis A includes an object point O, an image point I, a front focus F, a back focus F', a focal length f, and a transverse magnification β. Also, x is the axial distance from front focus F to object point O, and x' is the distance from back focus F' to image point I. Imaging by lens L is governed by Formula (1) (Newton's equation):

$$xx'=-f^2. \quad (1)$$

Transverse magnification β of lens L is defined by Formula (2):

$$\beta=(x'+f)/(x-f). \quad (2)$$

Using the relationships in Formulas (1) and (2), above, the transverse magnification β can be expressed as Formula (3):

$$\beta=f/x. \quad (3)$$

If object point O in FIG. 5 moves axially by an amount Δx, then image point I will move axially by a corresponding amount Δx'. In this case, from Newton's equation, the relationship in Formula (4) obtains:

$$(x+\Delta x)(x'+\Delta x')=-f^2. \quad (4)$$

The amount of movement Δx' of image point I is given by Formula (5):

$$\Delta x'=(f^2\cdot\Delta x)/\{x(x+\Delta x)\}. \quad (5)$$

Accordingly, the longitudinal magnification α=Δx'/Δx of the lens can be approximated, for small movements Δx of object point O, by Formula (6):

$$\alpha=f^2/\{x(x+\Delta x)\}\approx(f/x)^2=\beta^2. \quad (6)$$

With reference now to FIG. 6 and zoom lens 120, the front focus of first lens group G1 corresponds to an object point O2 of second lens group G2. If first lens group G1 moves along axis A by an amount Δx, then the object point O2 likewise moves by the same amount Δx. Accordingly, when first lens group G1 is made to move axially by an amount Δx, the amount of movement Δx' of image plane IP of the zoom lens is given by Formula (7):

$$\Delta x'=\Delta x\cdot\beta^2 \quad (7)$$

Furthermore, the focal length f of the entire zoom lens is given by Formula (8):

$$f=f\mathbf{1}\cdot\beta. \quad (8)$$

Here, f1 is the focal length of first lens group G1, and β is the combined transverse magnification produced by second lens group G2 and any lens groups downstream (i.e., imagewise) thereof. In a two-group zoom lens, such as zoom lens 120, transverse magnification β is that of second lens group G2.

In a zoom lens such as zoom lens 120, the value of transverse magnification β due to the second lens group G2 and any lens groups downstream thereof, will vary as a function of the focal length state (i.e., as a function of the "zoom position"). For this reason, a constant amount of movement Δx of first lens group G1 will not produce a constant amount of movement Δx' of image plane IP. Rather, the amount of movement Δx of image plane IP will vary as a function of the focal length state. It is thus useful to define the ratio K1W=Δx'/Δx, which is the ratio of the amount of axial movement Δx' of image plane IP with respect to the amount of movement Δx of first lens group G1 when in the extreme wide-angle state. The ratio K1W represent an "image plane movement index" for first lens group G1 when in the extreme wide-angle state.

Likewise, it is useful to define the ratio K1T=Δx'/Δx, which is the ratio of the amount of axial movement Δx' of image plane IP with respect to the amount of axial movement Δx of first lens group G1 when in the extreme telephoto state. The ratio K1T represents an image plane movement index for first lens group G1 when in the extreme telephoto state.

With reference now to FIG. 7, conventional adjustment method for zoom lens 120 is carried by "zooming adjustment," which is an asymmetrical adjustment. This method involves exploiting the difference between the image plane movement indices K1W and K1T and the elimination of the positional misalignment d between the actual image planes $IPW_2$ and $IPT_2$. In zooming adjustment, first lens group G1 is made to move by an amount Δx such that the relationship indicated in Formula (9) holds:

$$\Delta x(K\mathbf{1}t-K\mathbf{1}w)=d \quad (9)$$

Zooming adjustment by moving first lens group G1 by an amount Δx makes it possible to cause the actual image planes $IPW_2$ and $IPT_2$ to coincide at image plane IP. However, there will still be a positional misalignment D between image plane IP and the reference image plane IPR following zooming adjustment. In the conventional adjustment method, the positional misalignment D between the image plane IP and reference image plane IPR is adjusted by what is called "back adjustment." This involves changing the thicknesses of washers (not shown) that define the location of the mounting reference plane (not shown). This back adjustment is equivalent to making the entire zoom lens 120 move forward or backward along optical axis A.

In video cameras and electronic still cameras employing solid-state image sensors such as CCDs, it is desirable to be able to reduce the size of the zoom lens to keep up with the increasing miniaturization of the image sensor. However, with conventional zoom lenses, the lens barrel needs to be large enough to allow for a mechanical cam mechanism, such as described above. Accordingly, it has been difficult to achieve a suitably small zoom lens with a mechanical cam suitable for a video camera, electronic still camera, or the like employing ever-smaller solid-state image sensors.

With solid-state image sensors such as CCDs, individual differences arise in the distance between the mounting reference plane of the solid-state image sensor package and the reference image plane of the solid-state image sensor itself (i.e., this distance will vary from sensor array to sensor array). This makes it necessary to perform zoom lens adjustment after the image sensor package has been securely arranged on the zoom lens. In this case, with the conventional zoom lens adjustment method using measuring apparatus 70 employing collimator 100 and mirror 90 (See FIG. 4), the image sensor is securely arranged at the location at which mirror 90 would need to be installed. Thus, to date, it has not been possible to determine the locations of the actual image planes when in the extreme wide-angle and extreme telephoto states, making conventional adjustment of the zoom lens impossible.

SUMMARY OF THE INVENTION

The present invention pertains to a zoom lens adjustment method, and in particular to a method for adjusting positional misalignment between the actual image plane and the reference image plane.

An object of the present zoom lens adjustment method is to allow for a reduced-size zoom lens capable of use in video cameras, electronic still cameras, and the like employing increasingly smaller image sensors.

The present invention permits adjustment of positional misalignment between an actual image plane and a reference image plane in a zoom lens due to manufacturing error or the like. Because adjustment is carried out through the use of the electronic cam system, the zoom lens can be made much smaller than is otherwise possible with a conventional mechanical cam system.

Accordingly, the present invention is a method of adjusting a zoom lens having first and second lens groups, an actual image plane and a reference image plane, and capable of zooming over a range of focal length states from a first focal length state to a second focal length state. The method comprises the steps of first, determining an amount of integral movement δ1 of the first and second lens groups, from respective reference positions in the first focal length state, necessary to cause the actual image plane and the reference image plane to coincide. Then, the next step is determining an amount of movement δ2 of the first lens group necessary to cause the actual image plane and the reference image plane to coincide after moving the first and second lens groups by the amount of integral movement δ1 from respective reference positions in the second focal length state. Then, the next step is determining, from the amounts of movement δ1 and δ2, amounts of positional correction P1 and P2 of the first and second lens groups, respectively, from respective reference positions in one of the focal length states in the range of focal length states, necessary to cause the actual image plane and the reference image plane to coincide. Then, the final step is reducing positional misalignment between the actual image plane and the reference image plane over the range of focal length states from the first focal length state to the second focal length state by correcting the reference position of the first and second lens group by the amounts of positional correction P1 and P2, respectively.

BRIEF DESCRIPTION OF THE DRAWINGS

FIG. 2 is a schematic optical diagram of a zoom lens utilizing the mechanical cam system of FIG. 1 in the case where there is no positional misalignment of the image plane due to manufacturing errors or the like;

FIG. 3 is a schematic optical diagram of the zoom lens of FIG. 2 in the case where there is positional misalignment of the image plane due to manufacturing errors or the like;

DETAILED DESCRIPTION OF THE INVENTION

The present invention pertains to a zoom lens adjustment method, and in particular to a method for adjusting positional misalignment between the actual image plane and the reference image plane. In the present invention, the variable-magnification lens groups are axially moved by a zoom mechanism employing an electronic cam system rather than by a conventional mechanical cam system, as discussed further below.

Figure 1:
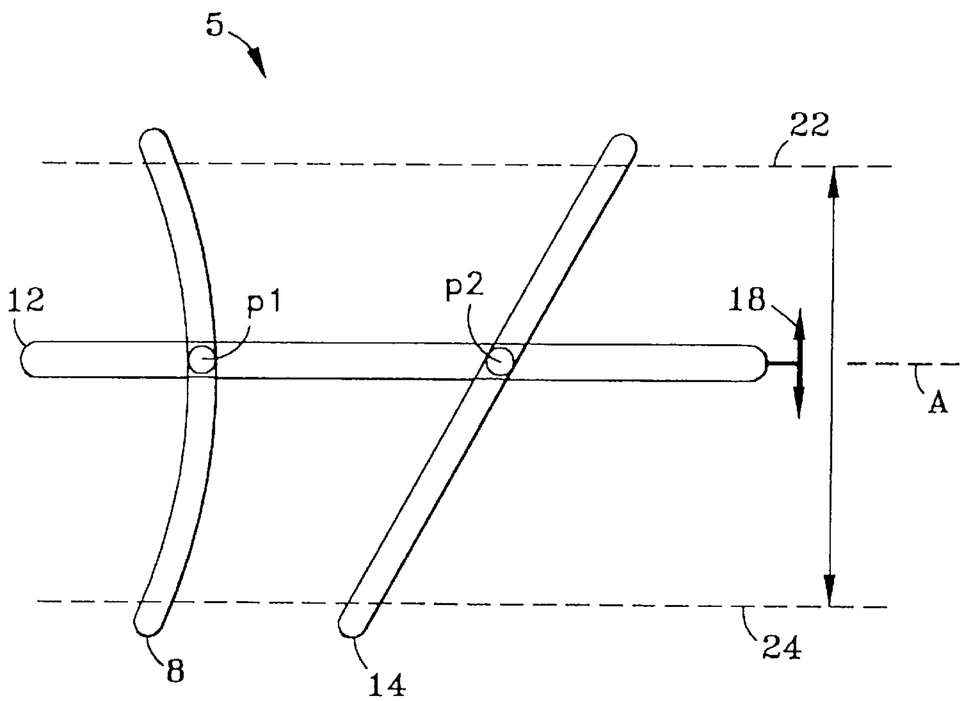
FIG. 1 shows a prior art mechanical cam system for a zoom lens for carrying out positioning of variable-magnification lens groups.
Figure 2:
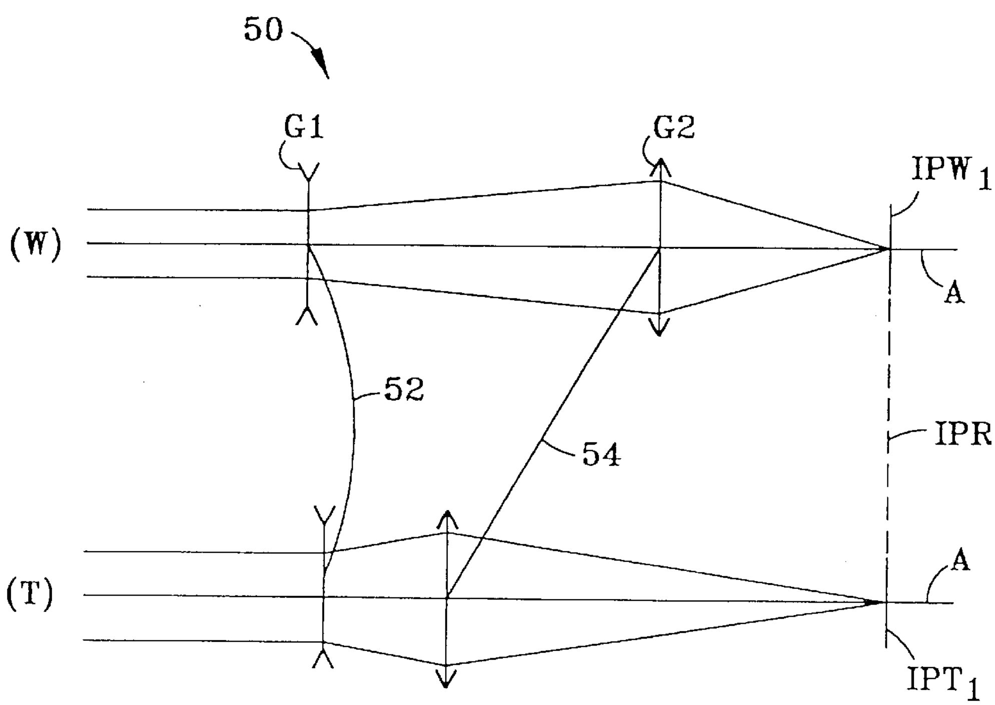
Figure 3:
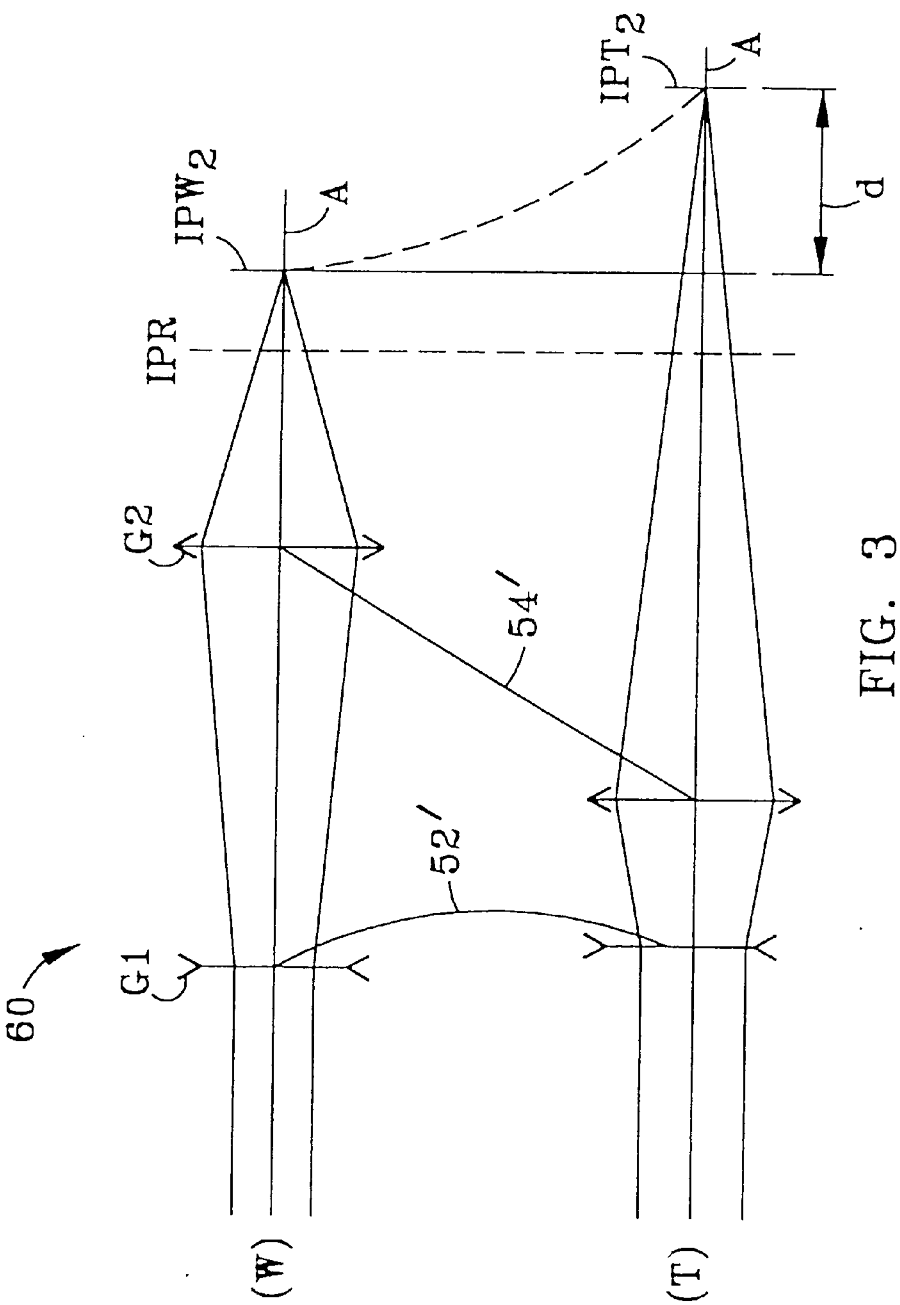
Figure 4:
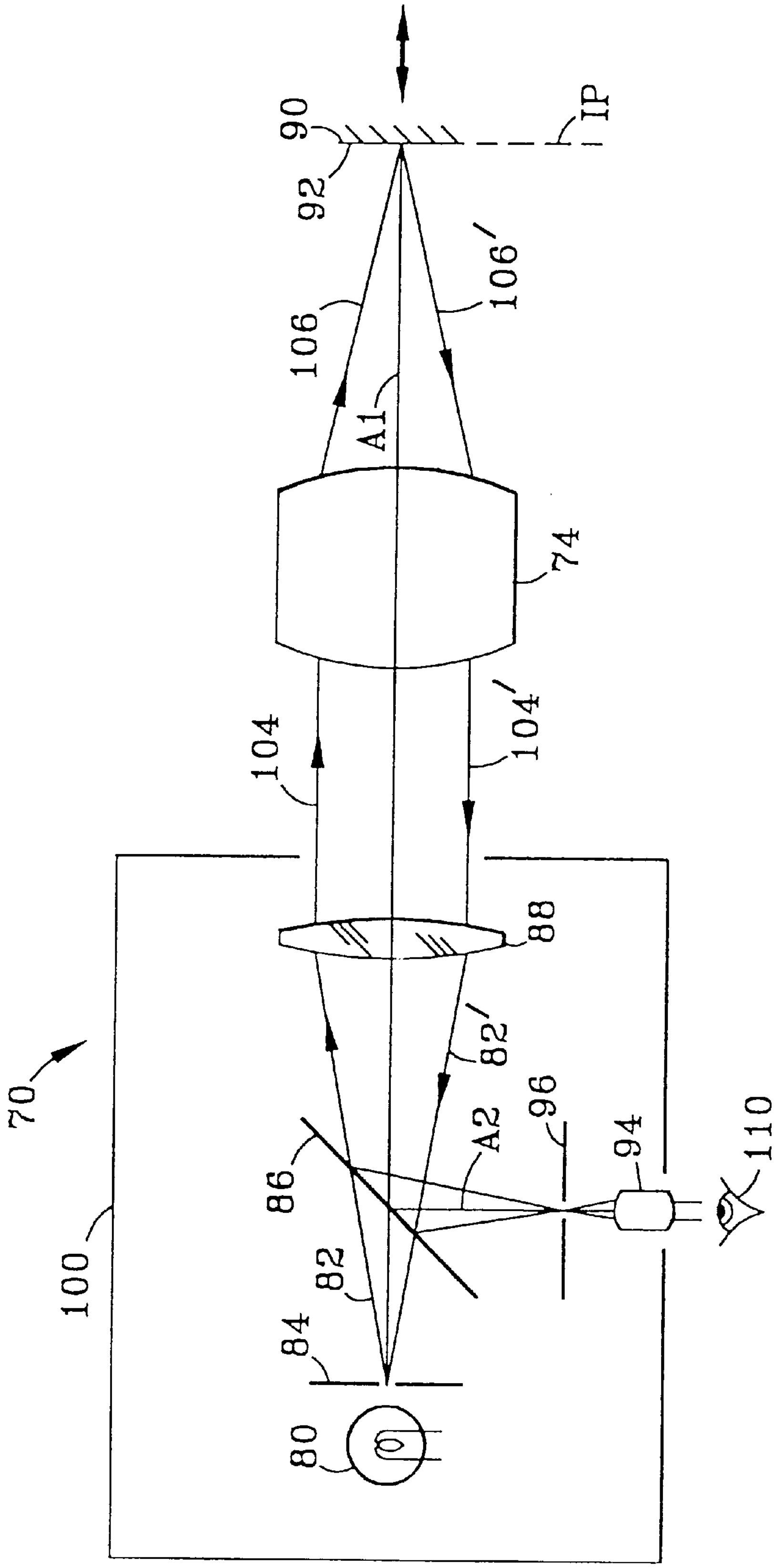
FIG. 4 is a schematic optical diagram of a measurement apparatus for measuring the position of the image plane of a zoom lens serving as target lens for performing a conventional zoom lens adjustment method.
Figure 5:
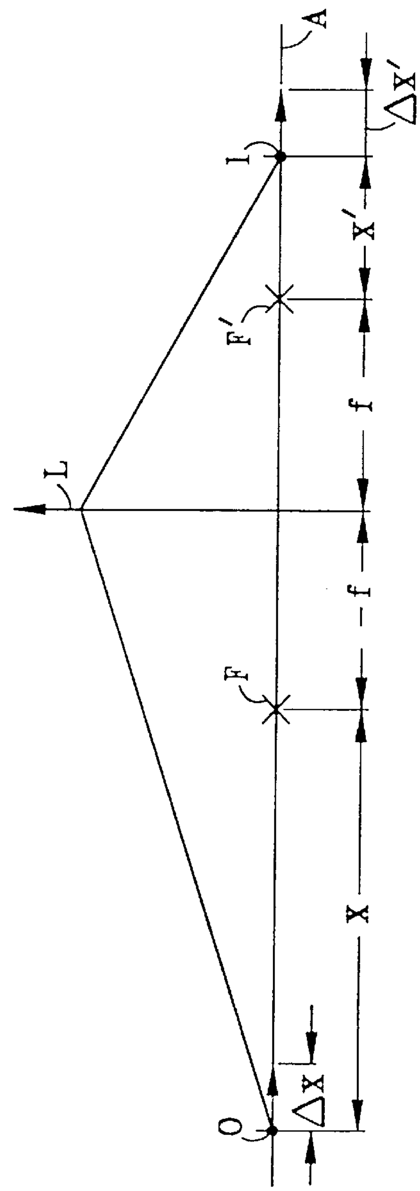
FIG. 5 is a schematic optical diagram illustrating the imaging properties of a single lens.
Figure 6:
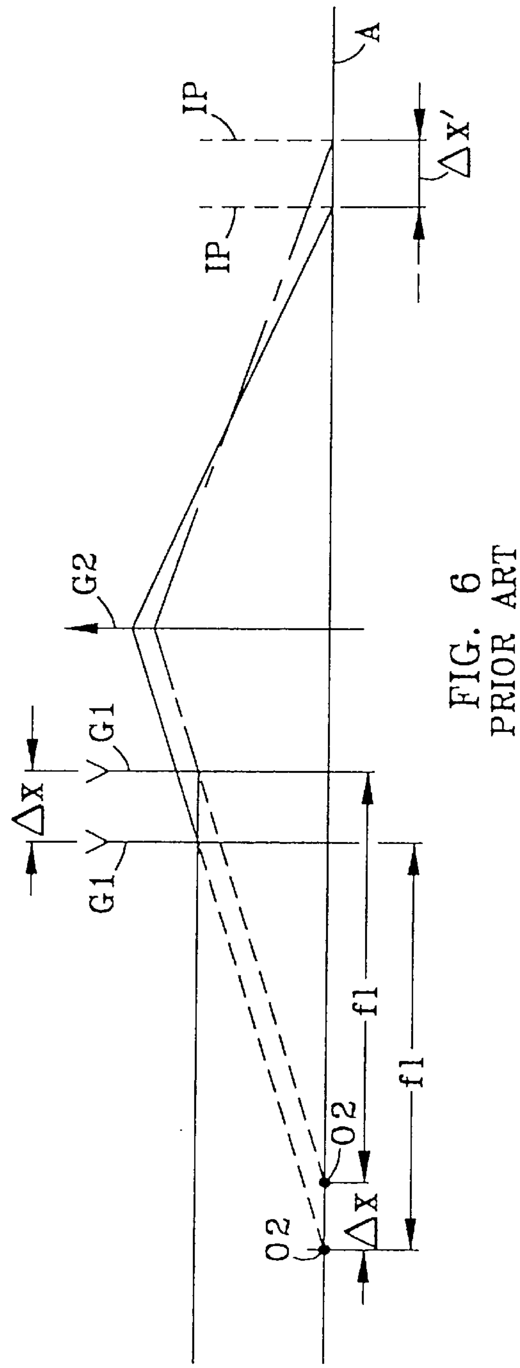
FIG. 6 is a schematic optical diagram illustrating the imaging properties of a negative-positive type two-group zoom lens.
Figure 7:
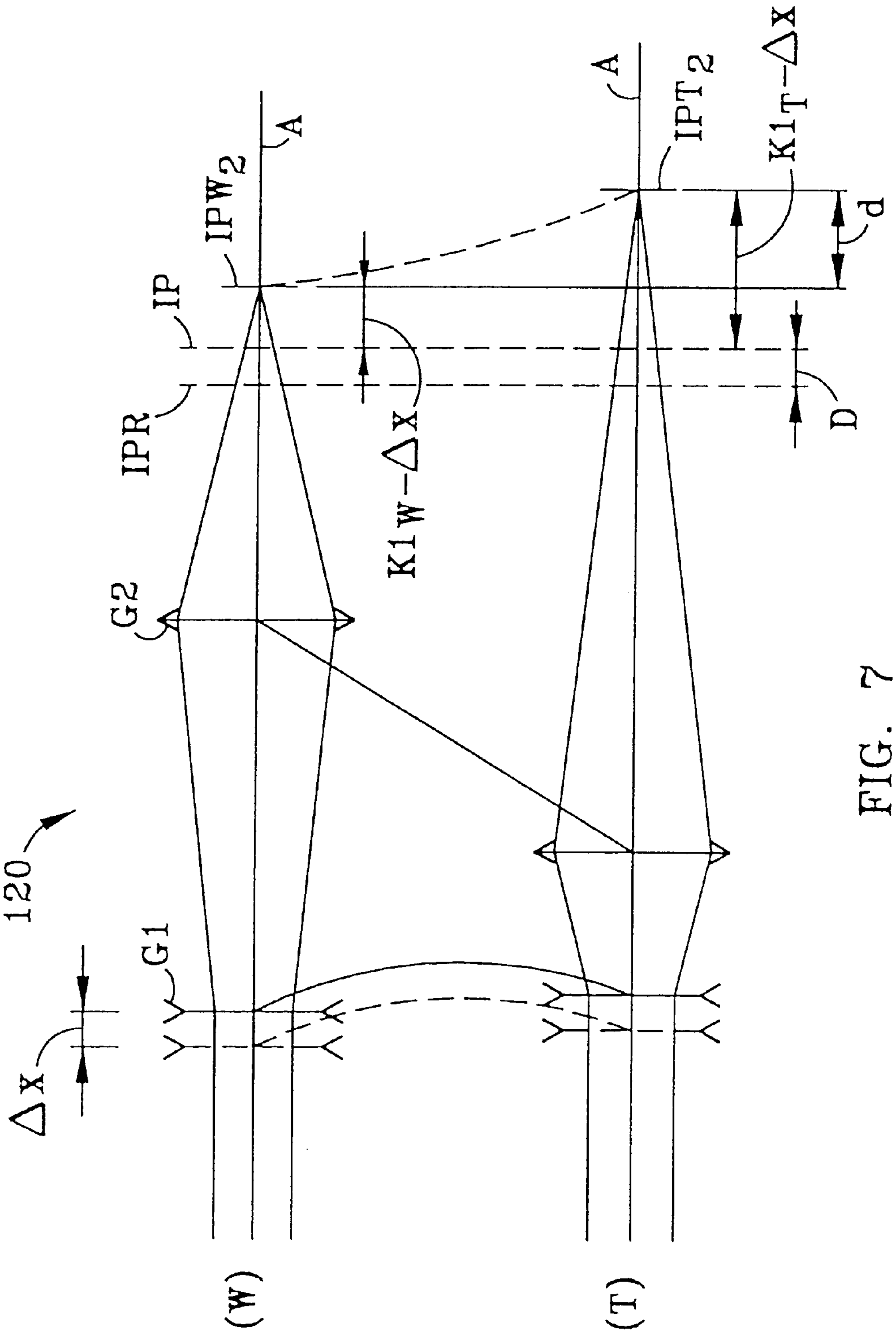
FIG. 7 is a schematic optical diagram illustrating a conventional zoom lens adjustment method.

As mentioned above, for a zoom lens for use in video cameras or electronic still cameras employing a solid-state image sensor, such as a CCD, the sensor is securely arranged relative to the zoom lens. Thus, it is impossible to determine the location of the actual image plane of the zoom lens by the conventional method and apparatus, as described above (see FIG. 4). Instead, a collimated light beam is made to be incident the "target" zoom lens and the location at which the contrast of the image formed on the sensor (e.g., surfaces of a CCD) is a maximum, based on the sensor output signal, is determined. This makes it possible to determine whether the actual image plane of the zoom lens coincides with the reference image plane (i.e, the location of the image sensor).

Figure 8:
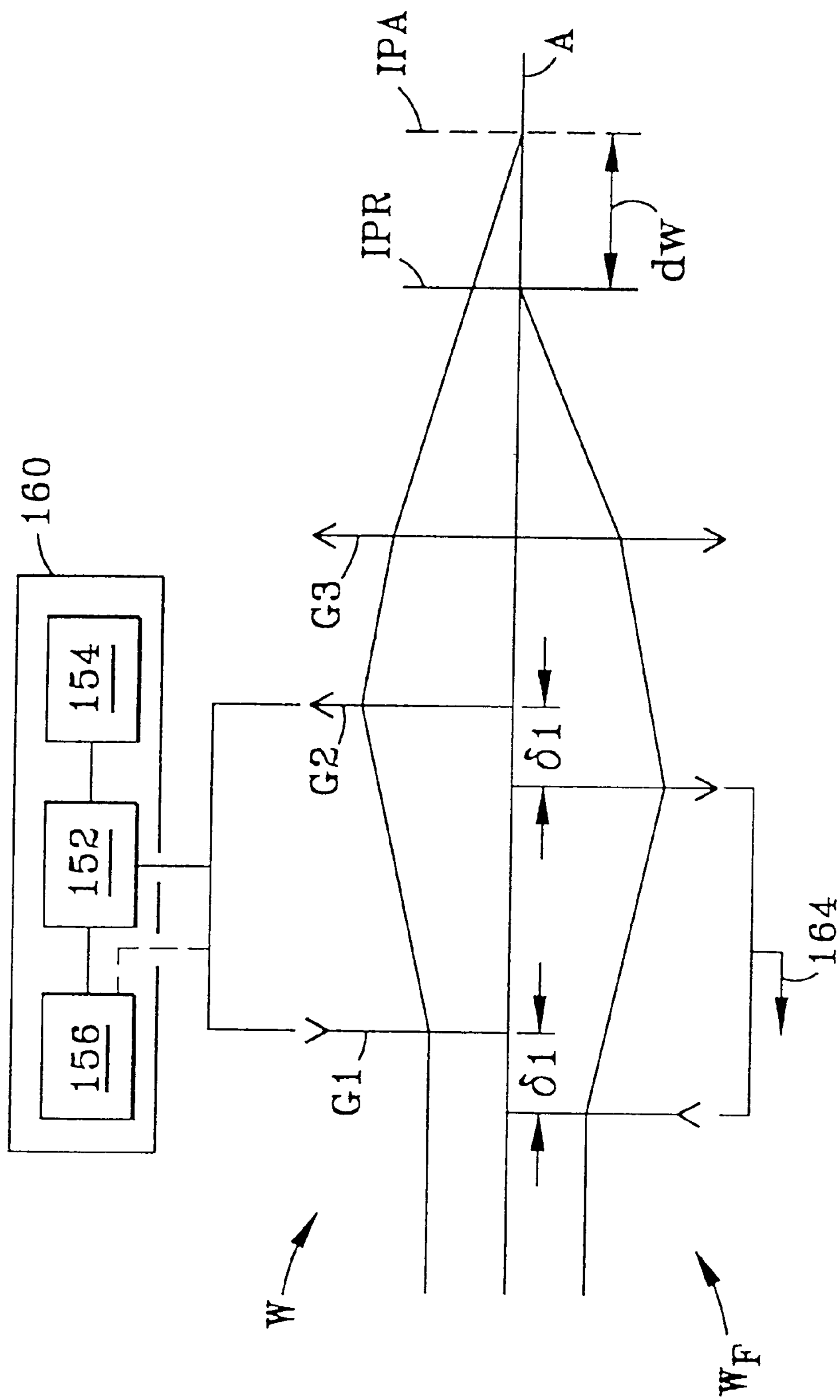
FIG. 8 is a schematic optical diagram illustrating the zoom lens adjustment method of the present invention, with the extreme wide-angle state (W) shown above the optical axis, and the extreme wide-angle state (focused condition) ($W_F$) shown below the optical axis.
Figure 9:
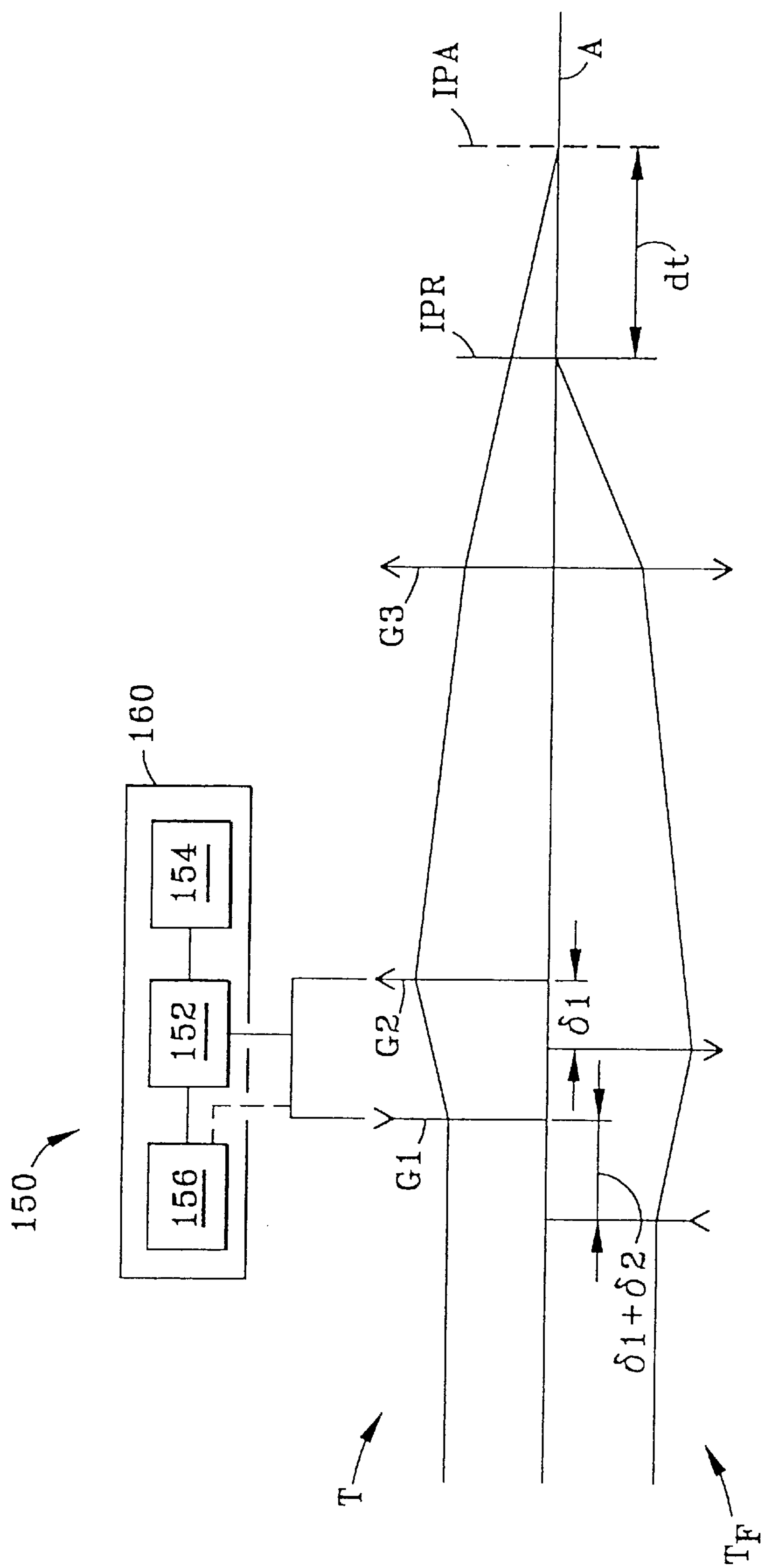
FIG. 9 is a schematic optical diagram illustrating the zoom lens adjustment method of the present invention, with the extreme telephoto state (T) shown above the optical axis, and the extreme telephoto state (focused condition) ($T_F$) shown below the optical axis.

With reference now to FIGS. 8 and 9, zoom lens 150 comprises, from an object (not shown) to reference image plane IPR (i.e., objectwise to imagewise) along optical axis A, an axially moveable first lens group G1 having negative refractive power, an axially moveable second lens group G2 having positive refractive power, and an axially stationary third lens group G3 having positive refractive power. First and second lens groups G1 and G2 are connected to a drive apparatus 152, which in turn, is connected to a memory device 154 and a photo-interrupter sensor device 156. Drive apparatus 152, memory device 154, and photo-interrupter sensor device 156 together constitute a control system 160 for controlling the axial positions of first and second lens groups G1 and G2.

Control system 160 operates as follows. Drive apparatus 152 axially moves first and second lens groups G1 and G2 to effectuate zooming based on positional values stored in memory device 154. These positional values thus represent "electronic cams," meaning that first and second lens groups G1 and G2 are positioned electronically based on predetermined stored values, rather than by mechanically limiting members (i.e., mechanical cams). Photo-interrupter sensor device 156 photonically detects the extreme wide angle state and extreme telephoto state reference positions of first and second lens groups G1 and G2 (as indicated by the dashed line) and provides a corresponding electrical signal to drive apparatus 152. Thus, control system 160 makes it possible to for zoom lens 150 to "electronically" zoom over the entire zooming range from the extreme wide-angle state to the extreme telephoto state, just as with a mechanical cam-based zoom lens.

The extreme wide-angle state W is shown above optical axis A. In this state, first lens group G1 and second lens group G2 are positioned in their extreme-wide-angle-state reference positions by control system 160. In addition, f1 is the focal length of first lens group G1, $\beta 2_W$ is the transverse magnification of second lens group G2 when in extreme wide-angle state W, $\beta_3$ is transverse magnification of third lens group G3, and $\beta_W$ $(=\beta 2_W \beta_3)$ is the combined transverse magnification of second lens group G2 and third lens group G3 when in extreme wide-angle state W. In addition, the focal length $f_W$ of the entire zoom lens 150 when in extreme wide-angle state W is given by Formula (10):

$$f_W = f\mathbf{1} \cdot \beta_W \tag{10}$$

With continuing reference to FIG. 8, the extreme wide-angle state (focused condition) $W_F$ is shown below optical axis A. In this state, control system 160 axially moves first and second lens groups G1 and G2 in integral fashion by an amount δ1, as indicated by arrow 164, from their extreme wide-angle focus state W reference positions so as to cause actual image plane IPA to axially move by an amount dw and coincide with the reference image plane IPR. Taking the image plane movement index when first lens group G1 and second lens group G2 are made to move in integral fashion to be K12, the amount of defocus dw existing in the extreme-wide-angle-state W is given by Formula (11):

$$dw = K\mathbf{12} \cdot \delta\mathbf{1} \tag{11}$$

Furthermore, image plane movement index K12 is also given by Formula (12), below.

$$K\mathbf{12} = \beta_3^2 \tag{12}$$

As described above, third lens group G3 remains stationary during zooming, and the transverse magnification $\beta_3$ remains constant and does not change as a function of zooming. Accordingly, the value of image plane movement index K12 remains constant throughout the focal length states from extreme wide-angle state W to extreme telephoto state T.

With reference now to FIG. 9 and zoom lens 150, the reference positions of the lens groups G1–G3 when in the extreme telephoto state T and in the extreme telephoto state (focused condition) $T_F$ are shown above and below optical axis A, respectively. Extreme telephoto state T refers to the condition when first lens group G1 and second lens group G2 have been positioned in their extreme-telephoto-state reference positions by control system 160. In extreme telephoto state T, $\beta_{2T}$ is the transverse magnification of second lens group G2, and $\beta_T$ $(=\beta_{2T}\beta_3)$ is the combined transverse magnification of second lens group G2 and third lens group G3. The focal length $f_T$ of the entire zoom lens in extreme telephoto state T is given by Formula (13):

$$f_T = f_1 \cdot \beta_T. \tag{13}$$

In extreme telephoto state (focused condition) $T_F$, control system 160 axially moves first lens group G1 and second lens group G2 in integral fashion by an amount δ1 from their extreme-telephoto-state T reference positions, and further causes only first lens group G1 to axially move by an amount δ2. This movement is such that actual image plane IPA axially moves by an amount dt so that it coincides with reference image plane IPR. Taking the image plane movement index for first lens group G1 in the extreme telephoto state to be $K1_T$, the amount of defocus dt existing when in extreme-telephoto-state T is given by Formula (14):

$$dt = K\mathbf{12} \cdot \delta\mathbf{1} + K1_T \cdot \delta\mathbf{2}. \tag{14}$$

The amount of defocus dw existing when in extreme-wide-angle-state W and the amount of defocus dt existing when in extreme-telephoto-state T can also be adjusted by carrying out zooming adjustment. This involves moving first lens group G1 axially by an amount Δz, and by carrying out back adjustment wherein first lens group G1 and second lens group G2 are made to axially move in integral fashion by an amount Δb. Thus, the following parameters can be defined:

dwz=the amount of defocus adjustment performed by carrying out zooming adjustment when in extreme wide-angle state W;

dtz=the amount of defocus adjustment performed by carrying out zooming adjustment when in extreme telephoto state T;

dwb=the amount of defocus adjustment performed by carrying out back adjustment when in extreme wide-angle state W; and dtb=the amount of defocus adjustment performed by carrying out back adjustment when in extreme telephoto state T.

The parameters dwb, dtb and db are equal i.e., dwb=dtb=db. Thus, the relationships in Formulas (15) and (19) obtain:

$$dw = dwz + db \tag{15}$$

$$dt = dtz + db \tag{16}$$

$$dwz = K1_W \cdot \Delta z \tag{17}$$

$$dtz = K1_T \cdot \Delta z \tag{18}$$

$$db = K\mathbf{12} \cdot \Delta b. \tag{19}$$

From the above Formulas, the relationships in Formulas (20) and (21) obtain:

$$dw = K1_W \cdot \Delta z + K\mathbf{12} \cdot \Delta b = K\mathbf{12} \cdot \delta\mathbf{1} \tag{20}$$

$$dt = K1_T \cdot \Delta z + K\mathbf{12} \cdot \Delta b = K\mathbf{12} \cdot \delta\mathbf{1} + K1_T \cdot \delta\mathbf{2}. \tag{21}$$

From Formula (20), the amount of back adjustment Δb is given by Formula (22):

$$\Delta b = \delta\mathbf{1} - (K1_W / K\mathbf{12})\Delta z. \tag{22}$$

Substituting the amount of back adjustment Δb given by Formula (22) into Formula (21), Formula (23) obtains:

$$K1_T \cdot \Delta z + K\mathbf{12} \cdot \delta\mathbf{1} - K1_W \cdot \Delta z = K\mathbf{12} \cdot \delta\mathbf{1} + K1_T \cdot \delta\mathbf{2}. \tag{23}$$

Thus, the amount of zooming adjustment Δz is given by Formula (24):

$$\Delta z = \{K1_T / (K1_T - K1_W)\}\delta\mathbf{2}. \tag{24}$$

Also, the amount of back adjustment Δb is finally given by Formula (25):

$$\Delta b = \delta\mathbf{1} - (K1_W / K\mathbf{12})\{K1_T / (K1_T - K1_W)\}\delta\mathbf{2}. \tag{25}$$

Thus, with continuing reference to FIGS. 8 and 9, to perform zoom lens adjustment according to the method of the present invention, first the amount of integral movement δ1 is determined. As mentioned above, this is the amount of integral axial movement of first lens group G1 and second lens group G2 from extreme-wide-angle-state W necessary to cause actual image plane IPA and reference image plane IPR to coincide. Then, the amount of additional movement δ2 is determined. This is the additional amount of axial movement of first lens group G1, by itself, necessary to cause actual image plane IPA and reference image plane IPR to coincide after axially moving first lens group G1 and second lens group G2 integrally while in extreme telephoto state T. Then, the amount of zooming adjustment Δz and the amount of back adjustment Δb are determined by Formulas (24) and (25), based on the amount of integral movement δ1 and the amount of additional movement δ2.

Figure 10:
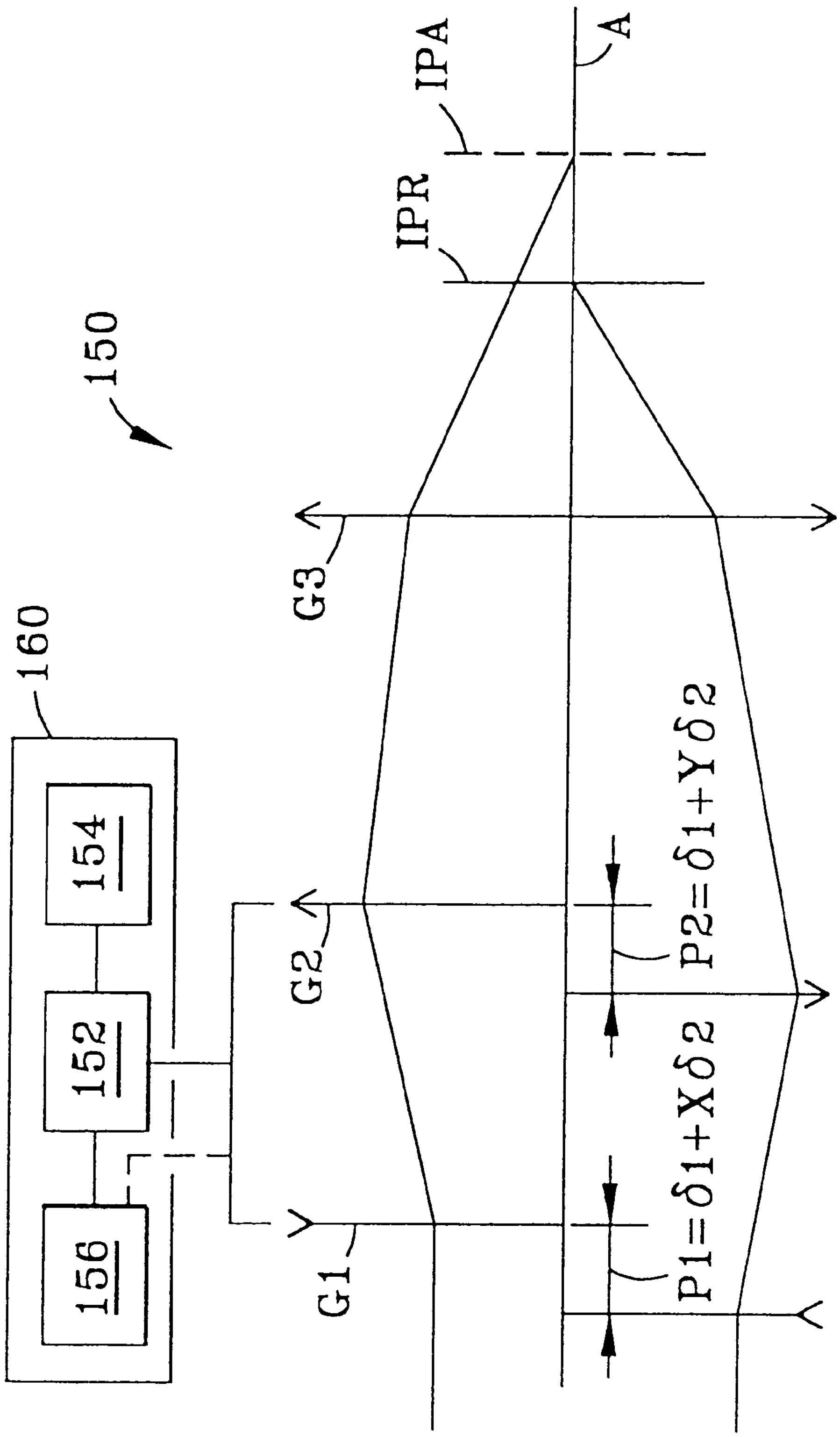
FIG. 10 is a schematic optical diagram illustrating the zoom lens adjustment method of the present invention, with the intermediate focal length state shown above the optical axis, and the intermediate focal length state with positional correction shown below the optical axis.

With continuing reference to FIGS. 8 and 9 and also to FIG. 10, in actually carrying out zooming, when in the respective focal length states from extreme wide-angle state W to extreme telephoto state T, the reference position of lens group G1 (i.e., the design position defined by control system 160) is corrected by an amount of positional correction P1=(Δz+Δb). The expression for P1 is the sum of zooming adjustment Δz and back adjustment Δb. Also, the reference position of second lens group G2 (i.e., the design position defined by control system 160) is corrected by the amount of positional correction P2=Δb, i.e., by the amount of back adjustment. As a result, adjustment of positional misalignment between actual image plane IPA and reference image plane IPR due to manufacturing error and the like is achieved.

Expressions for the amount of positional correction P1 and P2 for first lens group G1 and second lens group G2, respectively, are given by Formulas (26) and (27):

$$P1 = \Delta b + \Delta z = \delta 1 + \{1 - (K1_W / K12)\}\{K1_T / (K1_T - K1_W)\}\delta 2 \quad (26)$$

$$P2 = \Delta b = \delta 1 - (K1_W / K12)\{K1_T / (K1_T - K1_W)\}\delta 2 \quad (27)$$

By respectively replacing the coefficients of δ2 in Formulas (26) and (27) with X and Y, the amount of positional correction P1 and P2 for first lens group G1 and for second lens group G2 may be expressed as Formulas (28) and (29):

$$P1 = \delta 1 + X \cdot \delta 2 \quad (28)$$

$$P2 = \delta 1 + Y \cdot \delta 2 \quad (29)$$

Here, X and Y are constants characteristic of the zoom lens, and are given by Formulas (30) and (31):

$$X = \{1 - (K1_W / K12)\}\{K1_T / (K1_T - K1_W)\} \quad (30)$$

$$Y = -(K1_W / K12)\{K1_T / (K1_T - K1_W)\} \quad (31)$$

As described above, the present invention permits adjustment of positional misalignment between an actual image plane and a reference image plane in a zoom lens suitable for use in video cameras, electronic still cameras and the like employing solid-state image sensors. The adjustment method of the present invention performs adjustment through the use of an "electronic cam". Therefore, there is no increase in zoom lens size, and allows for the zoom lens size to be reduced as the size of the image sensors are reduced.

The above explanation of the present invention considered a three-group zoom lens. However for a two-group zoom lens, $\beta_3$ is set to 1. Furthermore, the present invention may be applied generally to multi-group zoom lenses used for a wide variety of imaging applications.

Also, in the above explanation of the method of the present invention, the amount of integral movement δ1 when in the extreme wide-angle state, and the amount of additional movement δ2 when in the extreme telephoto state are determined. However, it is also possible to determine the amount of integral movement δ1 when in the extreme telephoto state, and the amount of additional movement δ2 when in the extreme wide-angle state. It is also possible to determine, in general, the amount of integral movement δ1 when in a prescribed first focal length state, and to determine the amount of additional movement δ2 when in a prescribed second focal length state.

Accordingly, it will be apparent to one skilled in the art that the present invention, described above in connection with examples and preferred embodiments, is not so limited. On the contrary, it is intended to cover all alternatives, modifications and equivalents as may be included within the spirit and scope of the invention as defined in the appended claims.

What is claimed is:

1. A method of adjusting a zoom lens having first and second lens groups, an actual image plane and a reference image plane, and capable of zooming over a range of focal length states from a first focal length state to a second focal length state, the method comprising the steps of:

a) determining an amount of movement δ1 of the first and second lens groups, from respective reference positions in the first focal length state, necessary to cause the actual image plane and the reference image plane to coincide;

b) determining an amount of movement δ2 of the first lens group necessary to cause the actual image plane and the reference image plane to coincide after moving the first and second lens groups by said amount of movement δ1 from respective reference positions in the second focal length state;

c) determining, from said amounts of movement δ1 and δ2, amounts of positional correction P1 and P2 of the first and second lens groups, respectively, from respective reference positions in one of the focal length states in the range of focal length states, necessary to cause the actual image plane and the reference image plane to coincide; and d) reducing positional misalignment between the actual image plane and the reference image plane over the range of focal length states from the first focal length state to the second focal length state by correcting the reference position of the first and second lens group by said amounts of positional correction P1 and P2, respectively.

2. A method according to claim 1, wherein the first focal length state is an extreme wide-angle state and the second focal length state is an extreme telephoto state.

3. A method according to claim 2, wherein said amounts of positional correction P1 and P2 are expressed as:

$$P1 = \delta 1 + X \cdot \delta 2$$

$$P1 = \delta 1 + X \cdot \delta 2$$

$$P2 = \delta 1 + Y \cdot \delta 2$$

wherein X and Y are constants characteristic of the zoom lens.

4. A method according to claim 2, wherein the zoom lens further includes a third lens group being axially stationary during zooming and wherein said amounts of positional correction P1 and P2 are expressed as:

$$P1=\delta 1+X\cdot\delta 2$$

$$P2=\delta 1+Y\cdot\delta 2$$

wherein X and Y are constants characteristic of the zoom lens.

5. A method according to claim 1, wherein said amounts of positional correction P1 and P2 are expressed as:

$$P1=\delta 1+X\cdot\delta 2$$

$$P2=\delta 1+Y\cdot\delta 2$$

wherein X and Y are constants characteristic of the zoom lens.

6. A method according to claim 1, wherein the zoom lens further includes a third lens group being axially stationary during zooming and wherein said amounts of positional correction P1 and P2 are expressed as:

$$P1=\delta 1+X\cdot\delta 2$$

$$P2=\delta 1+Y\cdot\delta 2$$

wherein X and Y are constants characteristic of the zoom lens.

7. A method according to claim 5, wherein:

a) K12 is an amount of movement of the actual image plane when the first and said second lens groups move integrally by a unit amount;

b) $K1_W$ is an amount of movement of the actual image plane when the first lens group moves a unit amount when the zoom lens is in the first focal length state;

c) $K1_T$ is an amount of movement of the actual image plane when the first lens group moves a unit amount when the zoom lens is in the second focal length state; and d)

$$X=\{1-(K1_W/K12)\}\{K1_T/(K1_T-K1_W)\}$$

$$Y=-(K1_W/K12)\{K1_T/(K1_T-K1_W)\}.$$

* * * * *